(12) United States Patent
Kittleson et al.

(10) Patent No.: US 11,384,646 B2
(45) Date of Patent: Jul. 12, 2022

(54) METHOD FOR FORMING HOLLOW CERAMIC MATRIX COMPOSITE ARTICLE USING A MANDREL

(71) Applicant: GENERAL ELECTRIC COMPANY, Schenectady, NY (US)

(72) Inventors: Jacob John Kittleson, Greenville, SC (US); James Murray, Piedmont, SC (US)

(73) Assignee: General Electric Company, Schenectady, NY (US)

(*) Notice: Subject to any disclaimer, the term of this patent is extended or adjusted under 35 U.S.C. 154(b) by 548 days.

(21) Appl. No.: 16/405,014

(22) Filed: May 7, 2019

(65) Prior Publication Data

US 2019/0257207 A1    Aug. 22, 2019

Related U.S. Application Data

(62) Division of application No. 15/237,204, filed on Aug. 15, 2016, now Pat. No. 10,329,927.

(51) Int. Cl.
*F01D 5/28* (2006.01)
*B32B 18/00* (2006.01)
(Continued)

(52) U.S. Cl.
CPC ................ *F01D 5/282* (2013.01); *B32B 3/26* (2013.01); *B32B 18/00* (2013.01); *C04B 35/80* (2013.01);
(Continued)

(58) Field of Classification Search
CPC .. F23R 3/002; F23R 3/007; C04B 2235/3217; C04B 2235/3463; C04B 2235/3804; C04B 2237/343; C04B 2237/365; C04B 2237/368; C04B 2237/38; C04B 2237/61; C04B 35/117; C04B 35/14; C04B 35/185; C04B 35/488; C04B 35/52; C04B 35/5805; C04B 35/80; B29D 99/0028; Y10T 29/49336; Y10T 29/49337; Y10T 428/2419; F05D 220/30; F05D 220/32; F05D 2300/614; F05D 2300/20; F05D 2230/23; F05D 2230/30; F05D 2300/6033; F05D 2220/32; F01D 5/284;
(Continued)

(56) References Cited

U.S. PATENT DOCUMENTS 8,740,571 B2   6/2014  Garcia-Crespo
8,794,925 B2   8/2014  McCaffrey
(Continued)

*Primary Examiner* — Camie S Thompson
(74) *Attorney, Agent, or Firm* — Charlotte C. Wilson; James W. Pemrick

(57) ABSTRACT

A hollow CMC article, a mandrel for forming the article and a method for forming the article are disclosed. The article includes a ply-wrap layer defining a cavity. The ply-wrap layer includes a first face, a second face, a root portion bridging the faces, and a plurality of CMC wrap plies. The root portion defines a terminus of the ply-wrap layer including a cross-sectional conformation consisting of a curve having a single turning point. Each of the plurality of CMC wrap plies are disposed along the first face, wrap over the root portion, and extend along the second face. The hollow article further includes a plurality of CMC lateral plies disposed along the faces.

9 Claims, 3 Drawing Sheets

(51) Int. Cl.
*C04B 35/80* (2006.01)
*B32B 3/26* (2006.01)
*C04B 37/00* (2006.01)
*F01D 5/14* (2006.01)
*F01D 9/04* (2006.01)
*F01D 25/00* (2006.01)

(52) U.S. Cl.
CPC ............ *C04B 37/001* (2013.01); *F01D 5/147* (2013.01); *F01D 5/284* (2013.01); *F01D 9/041* (2013.01); *F01D 25/005* (2013.01); *B32B 2603/00* (2013.01); *C04B 2235/6028* (2013.01); *C04B 2237/32* (2013.01); *F05D 2220/32* (2013.01); *F05D 2300/6033* (2013.01)

(58) Field of Classification Search
CPC . F01D 5/282; F01D 5/147; F01D 5/20; F01D 5/30; F01D 9/041; B32B 18/00; B32B 2603/00; B32B 3/26
USPC ......... 416/229 A, 193 A, 219 R, 229 R, 232, 416/241 B, 204 A; 156/189; 29/889, 29/889.71, 889.7, 888.012; 415/200, 415/208.1, 115; 264/258, 259, 269; 428/293.4
See application file for complete search history.

(56) References Cited

U.S. PATENT DOCUMENTS

| | | |
|---|---|---|
| 9,050,769 B2 | 6/2015 | Monaghan et al. |
| 9,308,708 B2 | 4/2016 | Kleinow |
| 9,410,439 B2 | 8/2016 | Luczak |
| 9,663,404 B2 | 5/2017 | de Diego et al. |
| 9,689,265 B2 | 6/2017 | de Diego |
| 9,759,090 B2 | 9/2017 | Uskert et al. |
| 9,957,821 B2 | 5/2018 | Duelm et al. |
| 10,174,627 B2 | 1/2019 | Chang et al. |
| 10,408,084 B2 | 9/2019 | Thomas et al. |
| 10,487,675 B2 | 11/2019 | Chang et al. |
| 2009/0165924 A1 | 7/2009 | Steibel et al. |
| 2012/0279631 A1 | 11/2012 | Mizokami et al. |
| 2014/0199174 A1 | 7/2014 | Roberts, III et al. |
| 2014/0212292 A1 | 7/2014 | Xu |
| 2015/0377045 A1 | 12/2015 | Chang et al. |
| 2016/0258320 A1 | 9/2016 | Thomas et al. |
| 2017/0122114 A1* | 5/2017 | Kittleson ................ F01D 5/282 |

* cited by examiner

METHOD FOR FORMING HOLLOW CERAMIC MATRIX COMPOSITE ARTICLE USING A MANDREL

CROSS-REFERENCE TO RELATED APPLICATIONS

This application is a divisional and claims priority to U.S. patent application Ser. No. 15/237,204, filed Aug. 15, 2016 for "Hollow Ceramic Matrix Composite Article, Mandrel For Forming Hollow Ceramic Matrix Composite Article, And Method For Forming Hollow Ceramic Matrix Composite Article", which is hereby incorporated by reference in its entirety and is assigned to the assignee of the present invention.

FIELD OF THE INVENTION

The present invention is directed to hollow ceramic matrix composite (CMC) articles, mandrels for forming hollow CMC articles, and methods for forming hollow CMC articles. More particularly, the present invention is directed to hollow CMC articles, mandrels for forming hollow CMC articles, and methods for forming hollow CMC articles including a curve having a single turning point.

BACKGROUND OF THE INVENTION

Gas turbines are continuously being modified to provide increased efficiency and performance. These modifications include the ability to operate at higher temperatures and under harsher conditions, which often requires material modifications and/or coatings to protect components from such temperatures and conditions. As more modifications are introduced, additional challenges are realized.

One modification to increase performance and efficiency involves forming gas turbine components, such as, but not limited to, airfoils, buckets (blades), nozzles (vanes), combustion liners, and shrouds from CMC. However, CMC materials may be more susceptible to bending stresses and deformation than other structural materials such as superalloys. Therefore, for components which include hollow spaces, a wrap layer of CMC may be incorporated in order to stabilize the structure surrounding the hollow spaces. However, the CMC plies of the wrap layer may be susceptible to fraying prior to densification, particularly at each turning point of the CMC plies about the hollow spaces.

BRIEF DESCRIPTION OF THE INVENTION

In an exemplary embodiment, a hollow CMC article includes a ply-wrap layer defining a cavity disposed within the ply-wrap layer. The ply-wrap layer includes a first face, a second face, a root portion bridging the first face and the second face, and a plurality of CMC wrap plies. The root portion defines a terminus of the ply-wrap layer including a cross-sectional conformation, and the cross-sectional conformation consists of a curve having a single turning point. Each of the plurality of CMC wrap plies is disposed along the first face, wrap over the root portion, and extend along the second face. The hollow article further includes a plurality of CMC lateral plies disposed along at least one of the first face and the second face.

In another exemplary embodiment, a ply-support mandrel for forming a hollow CMC article includes a first face support, a second face support, and a root portion support bridging the first face support and the second face support. The root portion support defines a mandrel terminus, and includes a cross-sectional conformation. The cross-sectional conformation consists of a curve having a single turning point.

In another exemplary embodiment, a method for forming a hollow CMC article includes applying a plurality of CMC wrap plies to a ply-support mandrel. Applying the plurality of CMC wrap plies includes wrapping each of the plurality of CMC wrap plies along a first face support and a second face support of the mandrel and over a root portion support of the mandrel bridging the first face support and the second face support, and forming a ply-wrap layer supported on the mandrel. The ply-wrap layer includes a first face, a second face, and a root portion bridging the first face and the second face. The root portion support includes a cross-sectional conformation consisting of a curve having a single turning point. A plurality of CMC lateral plies is applied along at least one of the first face and the second face. The plurality of CMC wrap plies and the plurality of CMC lateral plies are consolidated, pyrolized, and densified. The mandrel is removed, forming a cavity disposed within the ply-wrap layer.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are hollow CMC articles, mandrels for forming hollow CMC articles, and methods for forming hollow CMC articles. Embodiments of the present disclosure, in comparison to processes not utilizing one or more features disclosed herein, decrease costs, decrease weight, increase process efficiency, increase production yield, increase strength, increase shear area, increase radial cross-sectional stiffness, decrease ply fraying, decrease deformation susceptibility, increase operating lifetime, or a combination thereof.

Figure 1:
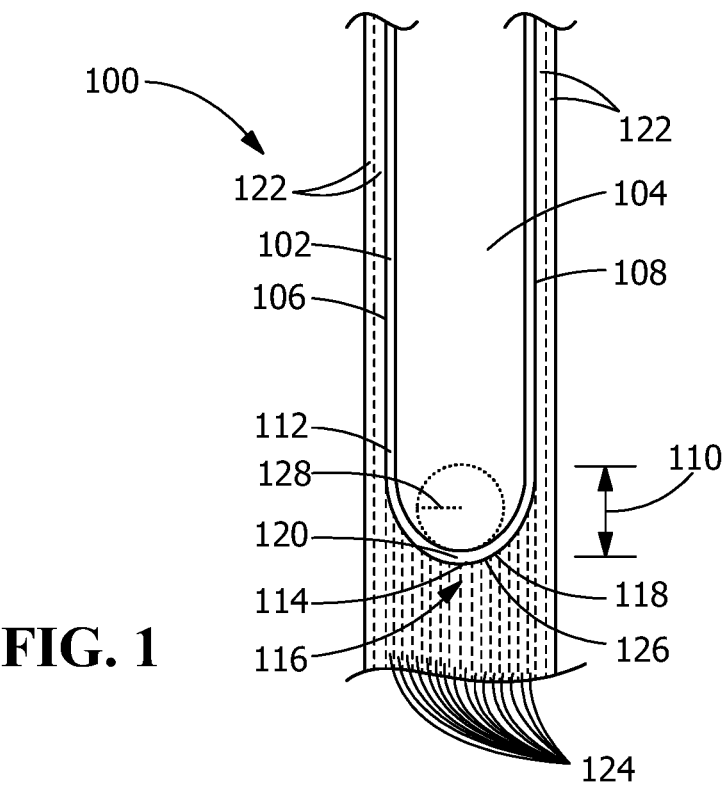
FIG. 1 is a cross-sectional view of a hollow CMC article, according to an embodiment of the present disclosure.

Referring to FIG. 1, in one embodiment, a hollow CMC article 100 includes a ply-wrap layer 102 defining a cavity 104 disposed within the ply-wrap layer 102. The ply-wrap layer includes a first face 106, a second face 108, a root portion 110 bridging the first face 106 and the second face 108, and a plurality of ceramic matrix composite wrap plies 112. The root portion 110 defines a terminus 114 of the ply-wrap layer 102 including a cross-sectional conformation 116, and the cross-sectional conformation 116 consists of a curve 118 having a single turning point 120. Each of the plurality of CMC wrap plies 112 is disposed along the first face 106, wraps over the root portion 110, and extends along the second face 108. The article 100 further includes a plurality CMC lateral plies 122 disposed along at least one of the first face 106 and the second face 108. The article may also include a plurality of CMC root plies 124 aligned with the plurality of CMC lateral plies 122 wherein each of the plurality of CMC root plies 124 includes a ply terminus 126 abutting the root portion 110 of the ply-wrap layer 102. The cavity 104 may be partially open to an external environment or the cavity 104 may be fully enclosed. The CMC article 100 may also include (not shown) additional CMC plies which do not extend along with first face 106 or the second face 108, and which do not include a ply terminus 126 abutting the root portion 110 of the ply-wrap layer 102.

The ply terminus 126 of each of the plurality of CMC root plies 124 may be staggered relative to one another along the root portion 110. Without being bound by theory, it is believed that staggering the ply termini 126 of the plurality of CMC root plies 124 relative to one another increases the shear area along the root portion and increases tolerance for lateral loads in comparison to a comparative embodiment (not shown) in which the ply termini 126 are substantially even along the root portion 110.

The plurality of CMC wrap plies 112, the plurality of CMC lateral plies 122, and, if present, the plurality of CMC root plies may independently include any suitable CMC composition. Suitable CMC compositions include, but are not limited to, aluminum oxide-fiber-reinforced aluminum oxide (Ox/Ox), carbon-fiber-reinforced carbon (C/C), carbon-fiber-reinforced silicon carbide (C/SiC), silicon-carbide-fiber-reinforced silicon carbide (SiC/SiC), carbon-fiber-reinforced silicon nitride (C/SiN), and combinations thereof.

The curve 118 may be any suitable curve 118 provided that curve 118 has only the single turning point 120. As used herein, "turning point" is defined as a point along the curve 118 at which the curvature of the curve 118 is a local maximum for a change of direction of at least about 30°, except that for a curve 118 which is a circular segment, or a portion of the curve 118 which is a circular segment changing direction by at least about 30°, the "turning point" is the point along the circular segment halfway between the beginning and end of the circular segment. Further, sequential changes of direction of less than 30° considered as a single change of direction having an averaged curvature. However, the limitation of only a single turning point 120 of the curve 118 does not exclude the presence of surface defects or textures, which are not considered to be deviations from the curve 118 or turning points 120. Suitable curves 118 may include, but are not limited to, irregular curves, circular segments, parabolic segments, elliptical segments, and combinations thereof. The curve 118 of the cross-sectional conformation 116 may vary across the root portion 110, for example across the root portion 110 in a direction orthogonal to the cross-section of FIG. 1.

The curve 118 may include any suitable minimum radius of curvature 128. In one embodiment, the minimum radius of curvature 128 is at least about 1 mm, alternatively at least about 2 mm, alternatively at least about 3 mm, alternatively at least about 4 mm, alternatively at least about 5 mm, alternatively at least about 10 mm. The minimum radius of curvature 128 may vary across the root portion 110, for example across the root portion 110 in a direction orthogonal to the cross-section of FIG. 1. Without being bound by theory, it is believed that having only a single turning point 120 along the curve 118 of the root portion 110 bridging the first face 106 to the second face 108, as opposed to two essentially right-angled turning points in a comparative example (not shown), provides a larger minimum radius of curvature 128 along the curve 118 than would be included in the comparative example having multiple turning points 120, and thereby decreases localized bending stress on the plurality of CMC wrap plies 112, reducing or eliminating fraying relative to the comparative example.

The article 100 may be any suitable article. In one embodiment, the article 100 is a turbine component. Suitable turbine components may include, but are not limited to, airfoils (shown), buckets (blades), nozzles (vanes), combustion liners, and shrouds.

Figure 2:
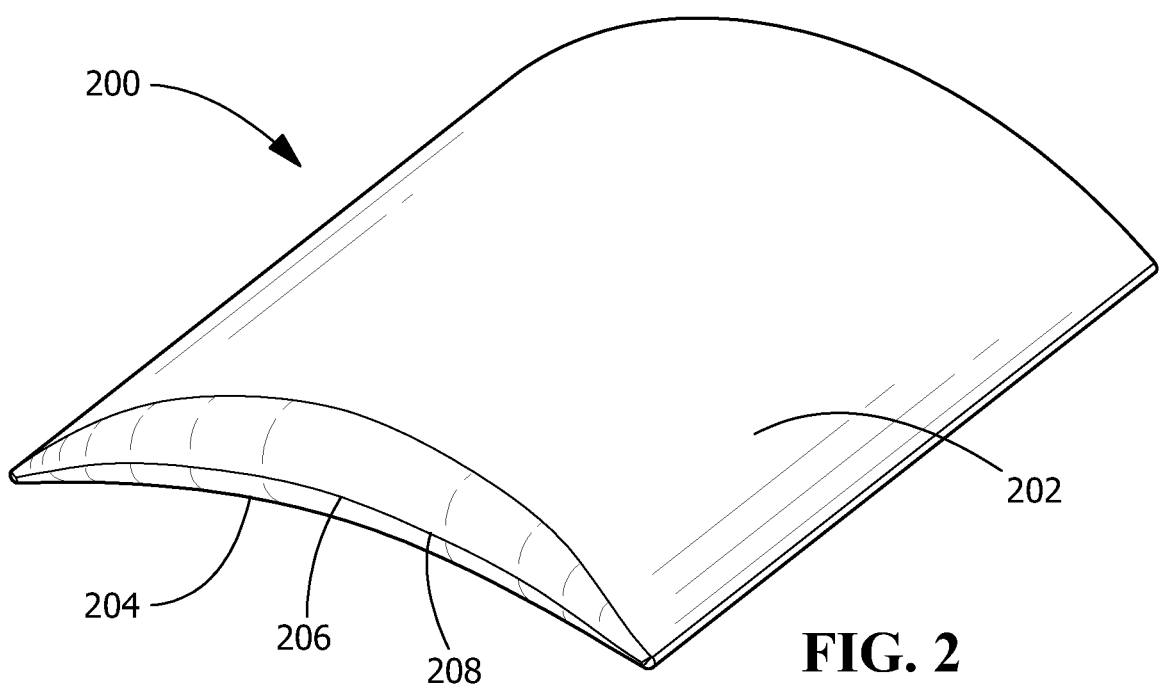
FIG. 2 is a perspective view of a mandrel, according to an embodiment of the present disclosure.

Referring to FIG. 2, in one embodiment, a method for forming the hollow CMC article 100 (as shown in FIG. 1) includes the use of a ply-support mandrel 200. The mandrel 200 includes a first face support 202, a second face support 204, and a root portion support 206 bridging the first face support 202 and the second face support 204. The root portion support 206 defines a mandrel terminus 208, and includes a cross-sectional conformation 116. The cross-sectional conformation 116 consists of a curve 118 having a single turning point 120. The mandrel 200 may be formed of any suitable material. In one embodiment the material includes a melting point of less than about 235° C., alternatively less than about 232° C., alternatively less than about 230° C. In another embodiment the material includes a melting point of less than about 330° C., alternatively less than about 328° C., alternatively less than about 325° C. Suitable materials include, but are not limited to, tin, lead, and combinations thereof.

Figure 3:
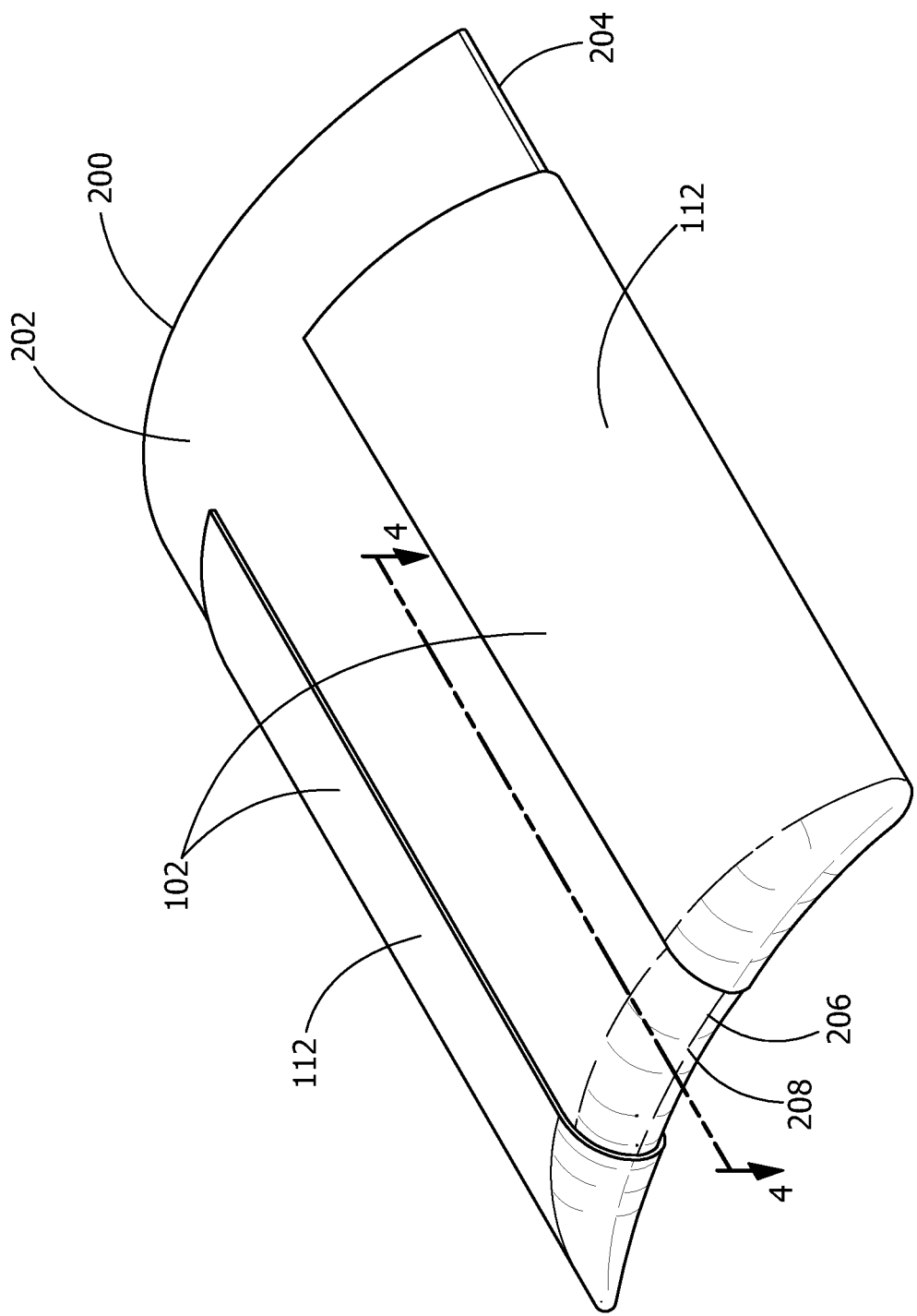
FIG. 3 is a perspective view of the mandrel of FIG. 2 wrapped with CMC wrap plies, according to an embodiment of the present disclosure.

Referring to FIG. 3, the method further includes applying a plurality of CMC wrap plies 112 to the mandrel 200. Applying the plurality of CMC wrap plies 112 includes wrapping each of the plurality of CMC wrap plies 112 along the first face support 202, over the root portion support 206, and along the second face support 204, forming the ply-wrap layer 102 supported on the mandrel 200.

Figure 4:
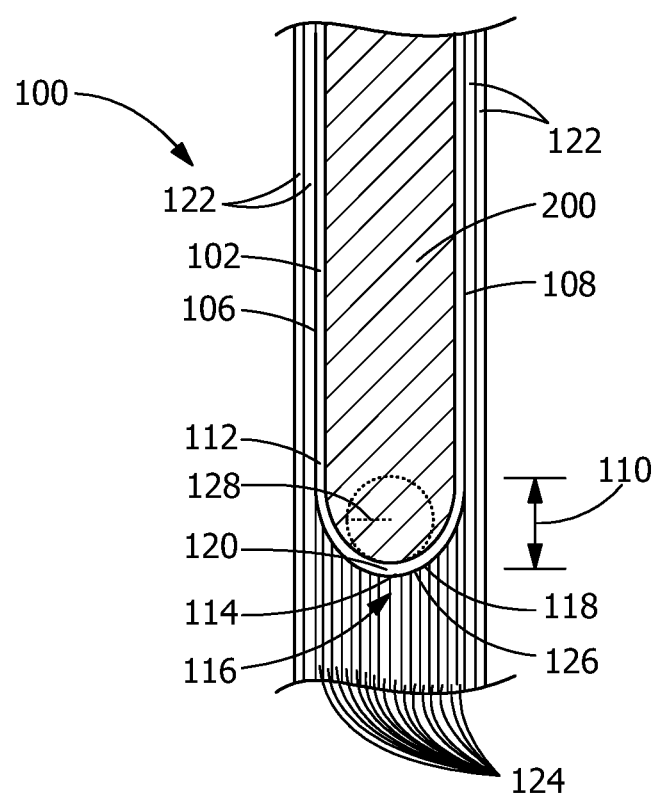
FIG. 4 is a cross-sectional view of the mandrel of FIG. 3 taken along 4-4, but with CMC lateral plies and CMC root plies laid up along the CMC wrap plies, according to an embodiment of the present disclosure.

Referring to FIG. 4, the method further includes applying a plurality of CMC lateral plies 122 along at least one of the first face 106 and the second face 108. The method may also include applying a plurality of CMC root plies 124 aligned with the plurality of CMC lateral plies 122 with the ply termini 126 of the plurality of CMC root plies 124 abutting against the root portion 110 of the ply-wrap layer 102.

Referring to FIG. 1, the method further includes consolidating, pyrolizing, and densifying the plurality of CMC wrap plies 112, the plurality of CMC lateral plies 122, and, if present, the plurality of CMC root plies 124, and removing the mandrel 200 to form the article 100 having the cavity 104 disposed within the ply-wrap layer 102. In one embodiment (not shown), after removing the mandrel 200 but before the densifying of the plurality of CMC wrap plies 112, the plurality of CMC lateral plies 122, and, if present, the plurality of CMC root plies 124, is complete, at least one additional ply is applied or at least one of the plurality of CMC wrap plies 112, the plurality of CMC lateral plies 122, and, if present, the plurality of CMC root plies 124, is manipulated to fully enclose the cavity 104. In a further embodiment (not shown), the fully enclosed cavity 104 is hermetically sealed.

In one embodiment, removing the mandrel 200 includes melting the mandrel 200 while pyrolizing the plurality of CMC wrap plies 112. Melting the mandrel 200 may include heating the mandrel to any suitable temperature, including, but not limited to, a temperature of at least about 230° C., alternatively at least about 232° C., alternatively at least about 235° C., alternatively at least about 325° C., alternatively at least about 328° C., alternatively at least about 330° C.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for forming a hollow ceramic matrix composite article, comprising:
    applying a plurality of ceramic matrix composite wrap plies to a ply-support mandrel, including:
        wrapping each of the plurality of ceramic matrix composite wrap plies along a first face support and a second face support of the ply-support mandrel and over a root portion support of the ply-support mandrel bridging the first face support and the second face support; and
        forming a ply-wrap layer supported on the ply-support mandrel, the ply-wrap layer including a first face, a second face, and a root portion bridging the first face and the second face, the root portion including a cross-sectional conformation, the cross-sectional conformation consisting of a curve having a single turning point;
    applying a plurality of ceramic matrix composite lateral plies along at least one of the first face and the second face;
    consolidating the plurality of ceramic matrix composite wrap plies and the plurality of ceramic matrix composite lateral plies;
    pyrolizing the plurality of ceramic matrix composite wrap plies and the plurality of ceramic matrix composite lateral plies;
    densifying the plurality of ceramic matrix composite wrap plies and the plurality of ceramic matrix composite lateral plies; and
    removing the ply-support mandrel, thereby forming a cavity disposed within the ply-wrap layer.

2. The method of claim 1, wherein removing the ply-support mandrel includes melting the ply-support mandrel while pyrolizing the plurality of ceramic matrix composite wrap plies and the plurality of ceramic matrix composite lateral plies.

3. The method of claim 1, further including applying a plurality of ceramic matrix composite root plies aligned with the plurality of ceramic matrix composite lateral plies, each of the plurality of ceramic matrix composite root plies including a ply terminus which is abutted against the root portion of the ply-wrap layer,
    wherein applying the plurality of ceramic matrix composite root plies includes staggering the ply terminus of each of the plurality of ceramic matrix composite root plies relative to one another along the root portion.

4. The method of claim 1, wherein applying the plurality of ceramic matrix composite wrap plies and the plurality of ceramic matrix composite lateral plies independently includes applying a ceramic matrix composite composition selected from the group consisting of an aluminum oxide-fiber-reinforced aluminum oxide (Ox/Ox), a carbon-fiber-reinforced carbon (C/C), a carbon-fiber-reinforced silicon carbide (C/SiC), a silicon-carbide-fiber-reinforced silicon carbide (SiC/SiC), a carbon-fiber-reinforced silicon nitride (C/SiN), and combinations thereof.

5. The method of claim 1, wherein forming the hollow ceramic matrix composite article includes forming a turbine component as the hollow ceramic matrix composite article.

6. The method of claim 5, wherein forming the turbine component includes forming an airfoil as the turbine component.

7. The method of claim 1, wherein forming the ply-wrap layer includes forming the curve having a single turning point selected from the group consisting of an irregular curve, a circular segment, a parabolic segment, an elliptical segment, and combinations thereof.

8. The method of claim 1, wherein forming the ply-wrap layer includes forming the curve having a single turning point including a minimum radius of curvature of at least 2 mm.

9. The method of claim 8, wherein forming the ply-wrap layer includes forming at least one of the minimum radius of curvature and the curve of the cross-sectional conformation to vary across the root portion.

* * * * *